Nov. 5, 1963  J. G. WIATT ETAL  3,109,265
IN-PROCESS WORKPIECE GAGING DEVICE
Filed Jan. 18, 1962  5 Sheets-Sheet 1

INVENTORS
JAMES G. WIATT
EDWARD C. BRUNS
JOHN W. TRAVIS
BY *Howard T. Keiser*
*John F. Verhoeven*
ATTORNEYS

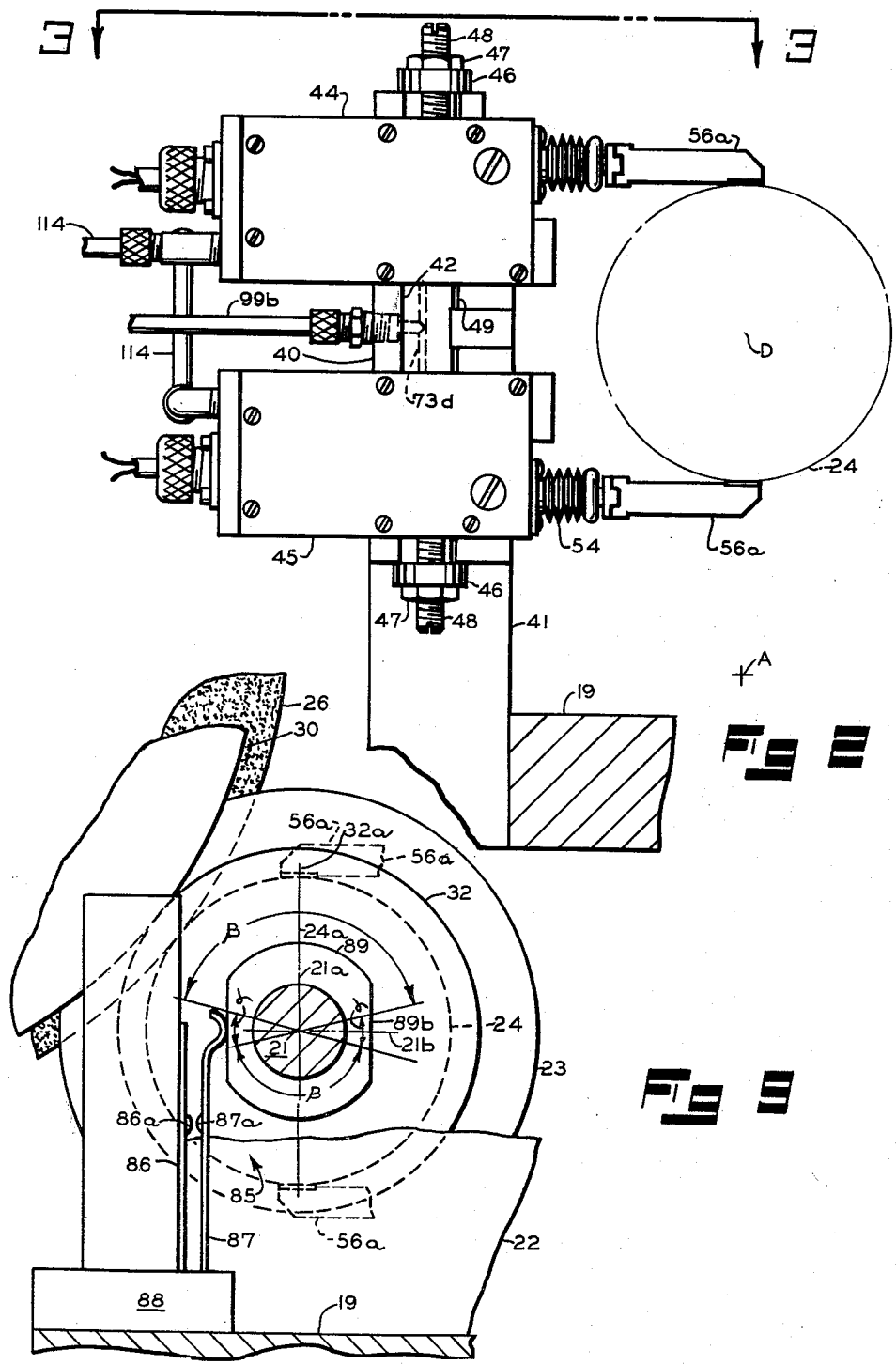

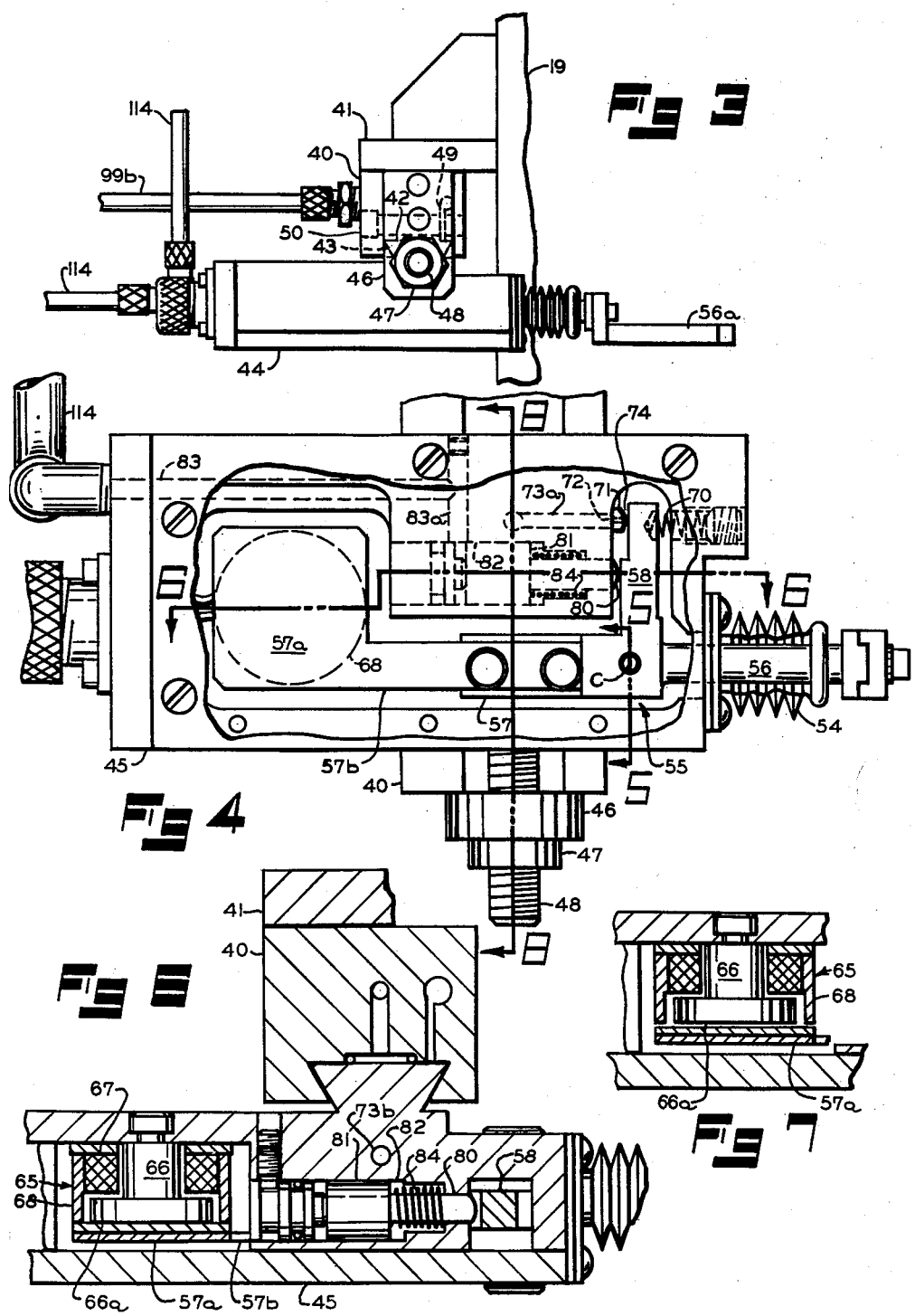

Nov. 5, 1963  J. G. WIATT ET AL  3,109,265
IN-PROCESS WORKPIECE GAGING DEVICE
Filed Jan. 18, 1962  5 Sheets-Sheet 4

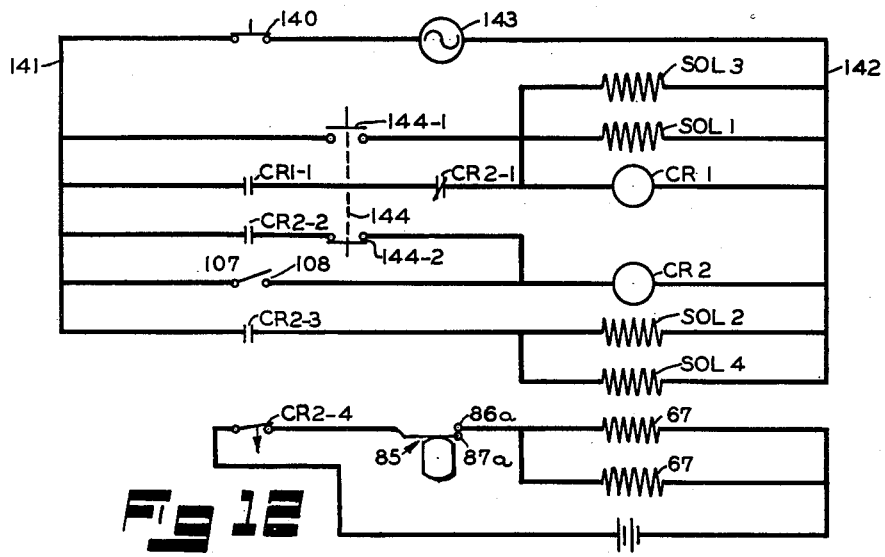
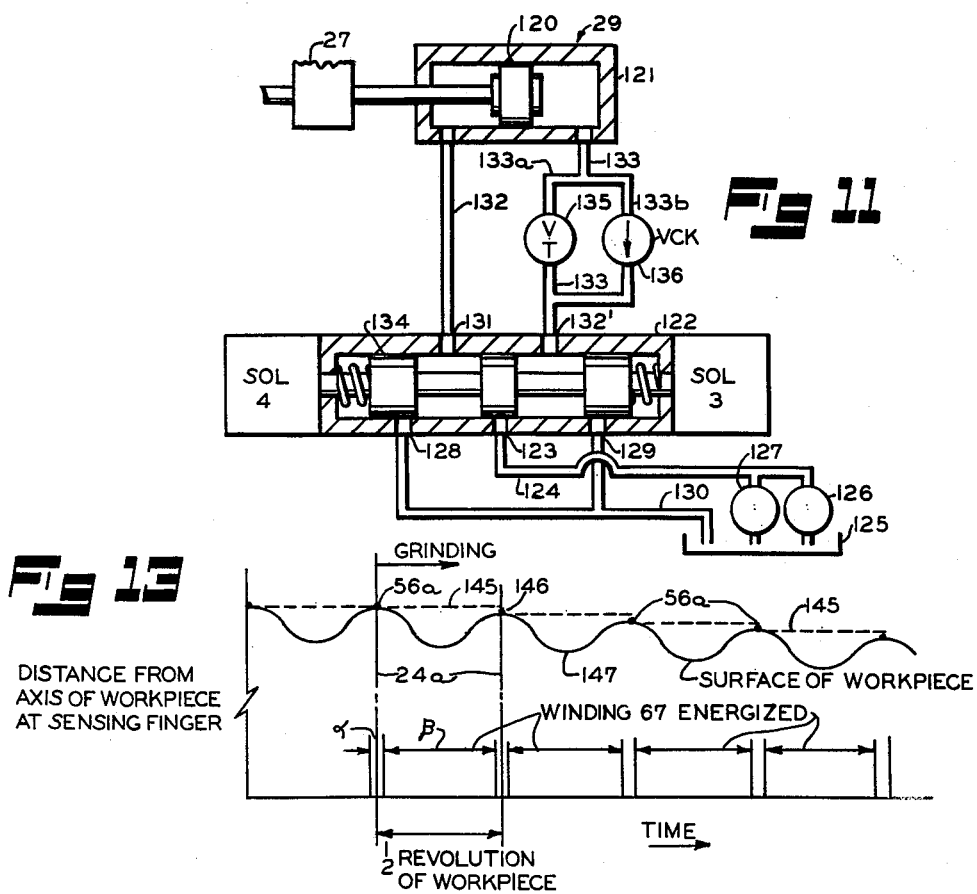

United States Patent Office 3,109,265
Patented Nov. 5, 1963

3,109,265
IN-PROCESS WORKPIECE GAGING DEVICE
James G. Wiatt, Edward C. Bruns, and John W. Travis, Cincinnati, Ohio, assignors to The Cincinnati Milling Machine Co., Cincinnati, Ohio, a corporation of Ohio
Filed Jan. 18, 1962, Ser. No. 167,136
12 Claims. (Cl. 51—165)

The present invention relates to a gaging device for measuring an in-process rotating workpiece, particularly suitable for in-process gaging in a grinding machine.

An in-process rotating workpiece which has, in cross-section, a continuous surface and which is being ground in a grinding machine to a final form of circular cross-section, can be conveniently measured while being ground by a gaging device having a sensing member in continuous engagement with the surface of the workpiece and having an indicating member continuously responsive to movement of the sensing member. As the in-process workpiece diminishes in size, the portion of the sensing member in engagement with the workpiece moves gradually in a single direction (toward the axis of the workpiece) and the indicating member responds in accordance with the position of the sensing member, which position is, at any instant, indicative of the size of the workpiece being ground.

If, however, the workpiece has, in cross-section, a discontinuous surface (such as a surface interrupted by a keyway) or is being ground to a noncircular cross-sectional form, such as an ellipse or oval, a sensing member is either incapable of continuously engaging the surface or, if the sensing member could continuously engage the surface, the sensing member would be rapidly reciprocated and the instantaneous position of the sensing member would not be indicative of the size of a particular single diameter of the workpiece.

There is disclosed herein a gaging device which can gage a rotating in-process workpiece of noncircular cross-section or a workpiece having an interrupted surface, and can accurately measure the portion of a rotating in-process workpiece most remote from the axis of the workpiece. The portion of the sensing member which is adapted to engage the workpiece does not reciprocate but, instead, moves in small steps in a single direction (toward the axis of the workpiece) and an indicating member which continuously responds to the position of the sensing member gives, at any instant, and accurate indication of the major dimension of the workpiece (such as the diameter on the major axis of a workpiece elliptical in cross-section). The gaging device for workpieces of noncircular cross-section has a locking member which is operated in coordination with the rotation of the workpiece alternately to grip and release the sensing member. As the sector of the rotating workpiece most remote from the axis of the workpiece approaches the portion of the sensing member adapted to engage the workpiece, the locking member is released momentarily to permit that portion of the sensing member to engage the workpiece at its major diameter. As the major diameter of the rotating workpiece leaves the workpiece engaging portion of the sensing member, the locking member, which is preferably an electromagnet, grips the sensing member to hold the workpiece engaging portion thereof stationary relative to the workpiece until the major diameter again approaches the workpiece engaging portion of the sensing member. Thus the workpiece engaging portion of the sensing member is disengaged from the workpiece as portions of smaller radial span (such as the minor axis of a workpiece of elliptical cross-section or a keyway in a workpiece) pass, and the sensing member is not subjected to reciprocating movement towards and away from the axis of the workpiece. Instead, the workpiece engaging portion of the sensing members moves, during the operation on the workpiece, only toward the axis of the workpiece, and moves in small incremental steps closely approximating the steady movement of a sensing member in engagement with a workpiece having a continuous surface and which is being ground to a final form of circular cross-section. The gaging device has an indicating member continuously responsive to the position of the sensing member and, since the sensing member is not reciprocating, the indicating member gives an accurate indication of the size of the major diameter of the workpiece.

Another feature of the gage disclosed herein, a feature which is applicable to in-process gaging devices measuring workpieces being formed to circular or noncircular form, permits the gage to be quickly engaged with and disengaged from the workpiece to facilitate insertion and removal of workpieces into and out of the machine.

It is therefore an object of the present invention to provide an improved gaging device for measuring an in-process rotating workpiece of noncircular cross-section.

It is another object of the present invention to provide an improved gaging device for measuring an in-process rotating workpiece of noncircular cross-section in which the portion of the sensing member adapted to engage the workpiece does not reciprocate during the operation on the workpiece but, instead, moves in a single direction toward the axis of the workpiece.

It is still another object of the present invention to provide an improved in-process gaging device for a machine tool which is operable to facilitate loading and unloading of workpieces into and out of the machine.

Other objects and advantages of the present invention should be readily apparent by reference to the following specification, considered in conjunction with the accompanying drawings forming a part thereof, and it is to be understood that any modifications may be made in the exact structural details there shown and described, within the scope of the appended claims, without departing from or exceeding the spirit of the invention.

In the drawings:

FIG. 2 is a view taken on the line 2—2 of FIG. 1;

FIG. 3 is a view taken on the line 3—3 of FIG. 2;

FIG. 4 is an enlarged view, taken as the view of FIG. 2, of the lower sensing member carrier with the cover broken away for clarity;

FIG. 6 is a view taken on the line 6—6 of FIG. 4, with the sensing member shown as when gripped by the electromagnet on energization thereof;

FIG. 7 is a fragmentary view taken as the view of FIG. 6 with the sensing member shown as when released by the electromagnet on deenergization thereof;

FIG. 9 is a view taken on line 9—9 of FIG. 1;

FIG. 11 is a schematic hydraulic diagram showing mechanism for effecting feed of the grinding wheel;

FIG. 12 is a schematic electrical diagram of the gaging device; and

FIG. 13 is a graphical representation showing deenergization of the electromagnet and movement of the sensing member as coordinated with rotation of the workpiece.

Figure 1:
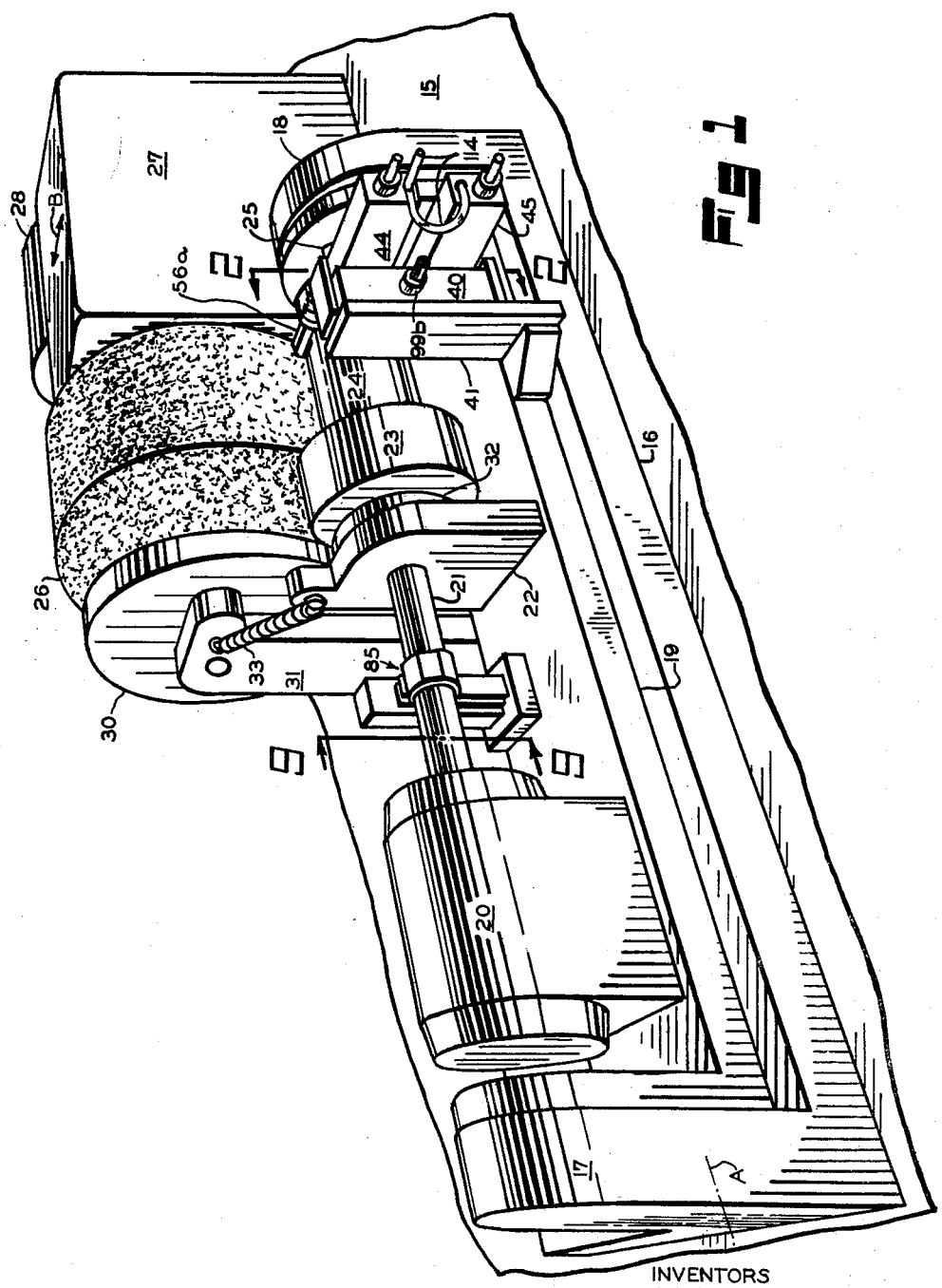
FIG. 1 is a view, in perspective, of a grinding machine for forming workpieces of elliptical cross-section with the gaging device mounted thereon for in-process gaging.

There is shown in FIG. 1, a grinding machine for forming workpieces of noncircular cross-section. Mounted on base 15 is a table 16 having upstanding portions 17 and 18 at each end. A cradle 19 is pivotally connected between table end portions 17 and 18 spaced from the upper surface of the table for rocking movement about axis A. A motor 20 is mounted on the cradle and rotates shaft 21 journaled in an intermediate support 22 secured to the cradle. A headstock 23, which is driven by shaft 21, rotates a workpiece 24 supported between the headstock and a center 25 mounted in an upstanding end portion of the cradle. Grinding wheel 26 is rotatably mounted in wheelhead 27 and driven through the wheelhead by motor 28. The wheelhead, which is mounted on base 15, is movable, as indicated at B towards and away from the table 16 (and towards and away from the workpiece 24 mounted on the table cradle) by a hydraulic motor 29 (see FIG. 11).

During grinding, the wheelhead is fed into the workpiece and a conformation of elliptical cross-section is imparted to the workpiece by a rocking motion imparted to the cradle (and the workpiece mounted thereon) in coordination with the rotation of the workpiece. Rocking motion of the cradle is effected by means of a circular guide plate 30 rotatably mounted on a standard 31 secured to the table 16 and an elliptical cam 32 mounted on and rotated by shaft 21. The cam 32 is urged into engagement with the rotatable circular guide plate 30 by spring 33 so that on each revolution of cam 32, and hence each revolution of the workpiece 24, the cradle 19 and the workpiece 24 are rocked relative to the grinding wheel 26 to produce the desired form of elliptical cross-section on the workpiece.

The above described structure is typical of a grinding machine for producing workpieces of noncircular cross-section. The gaging device of the present invention is particularly suitable for in-process gaging in a machine of this type and operates, during grinding, to give an accurate size indication of the sector of the workpiece in process most remote from the axis of rotation of the workpiece, as, for example the diameter on the major axis of a workpiece of elliptical cross-section.

As shown in FIGS. 2 and 3, a gage head body 40 is connected to a bracket 41 which is secured to the edge of the cradle 19. The gage head body 40 has a dovetail recess 42 to receive dovetail portions 43 extending from each of a pair of sensing member carriers or supports, 44 and 45. A plate 46 connected at each end of body 40 has a nut 47 journaled therein which threadedly receives a screw 48 extending from each of the carriers 44, 45 so that, by rotation of nuts 47, the positions of the two carriers on body 40 can be adjusted. Slit 49 in body 40, emanating from the dovetailed recess 42 in the regions receiving the carrier dovetails 43, permit the sides of the dovetail recess in the body to be drawn tight on the carrier dovetails by bolts 50 to secure the carriers in adjusted position on the body.

Figures 5, 8:
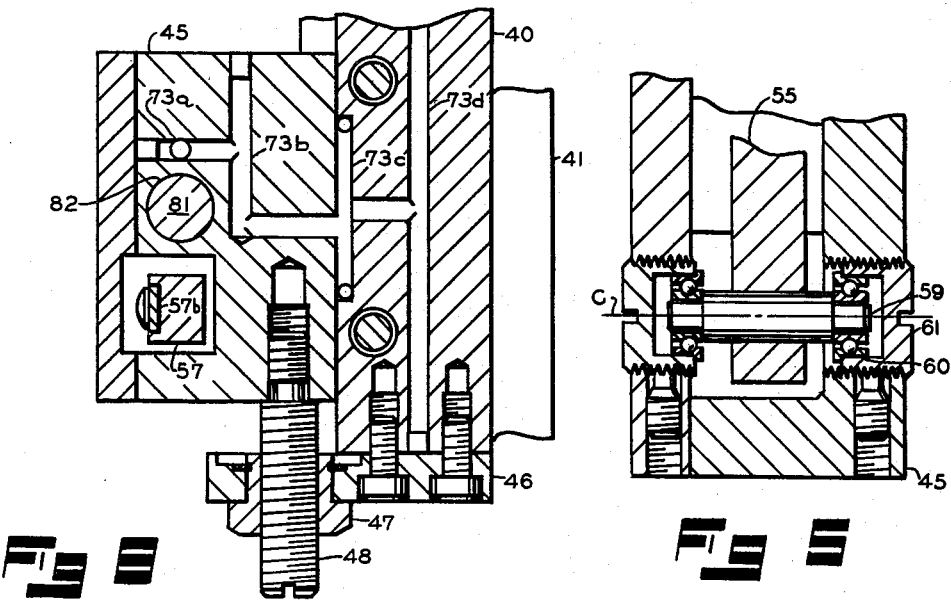
FIG. 5 is an enlarged view taken on the line 5—5 of FIG. 4.
FIG. 8 is a view taken on line 8—8 of FIG. 4.

As shown best in FIG. 4, each of the carriers 44, 45 has a sensing member, indicated generally at 55, mounted therein for pivotal movement about axis C. The sensing member 55 includes a portion 56 extending forwardly from the pivot axis C toward the workpiece (through the flexible protecting cover 54) and terminating in a finger portion 56a adapted to engage the workpiece. The sensing member also includes a portion 57 extending rearwardly from the pivot axis C and terminating in a plate portion 57a at the end of an arm portion 57b. Another portion 58 of the sensing member extends from the pivot axis C perpendicular to forwardly and rearwardly extending portions 56 and 57. As shown in FIG. 5, the sensing member 55 is secured on a pin 59 whch is received in a pair of ball bearings 60 to define the axis C of pivotal movement of the sensing member. The ball bearings 60 are secured in nuts 61 threadedly received, respectively, in the body and the cover of the carriers.

An electromagnet, indicated generally at 65, is mounted in each carrier 44, 45 adjacent the plate portion 57a of the sensing member, as shown in FIGS. 6 and 7. The electromagnet defines a locking member which is operated alternately to grip (FIG. 6) and release (FIG. 7) the sensing member 55. The electromagnet 65 comprises a core 66 secured to the carrier (the carrier being made of nonmagnetic stanless steel), a winding 67 surrounding the core to magnetize the core when the winding is energized, and a magnet casing 68. The core has a face 66a which is flush with magnet casing 68, and the plate portion 57a of the sensing member is parallel to face 66a of the electromagnet. The pivotal movement of the sensing member about axis C is limited and the plate portion 57a of the sensing member is always in registration with the face 66a of the magnet. The plate portion 57a of the sensing member is normally spaced from the face 66a of the magnet (when the electromagnet is deenergized) as shown in FIG. 7, but when the winding 67 is energized, the plate portion 57a is deflected into engagement with the face 66a and casing 68, as shown in FIG. 6, to lock the sensing member. The plate portion 57a is thicker than the resilient arm portion 57b to provide a better path for the magnetic flux. The gage body 40 and sensing member carriers 44 and 45, since they are secured to the cradle 19, rock as a unit with the workpiece 24 during grinding. Each sensing member 55 pivots as a unit in the repective carriers 44, 45 about axis C and when plate portions 57a are held by the electromagnets, finger portions 56a, although rocking with the carriers and cradle, are held stationary relative to the rotating workpiece which is also rocking with the cradle. When windings 67 are deenergized the magnets (which may be similar to the Warner Brake Clutch Coupling Magnets type SF–100) retain very little permanent magnetism and instantly release the plate portions 57a of the sensing members which spring back to their normal positions spaced from the magnet face 66a (see FIG. 7).

Each sensing member 55 is biased, by a compressed spring 70 mounted in the carrier and engaged with portion 58 of the sensing member, to urge the finger portions 56a, which are positioned on opposite sides of a workpiece 24 mounted in operating, or grinding, position on the cradle 19, toward the axis of rotation D of the workpiece 24 for engagement of the finger portions with the surface of the workpiece when the locking members release the sensing members. Each of the carriers 44, 45 has a button 71 adjacent sensing member portion 58, on the side opposite the spring 70, which defines an orifice 72 in communication with portion 73a of air discharge passage 73. As the finger portion 56a of the sensing member moves toward the axis of the workpiece the gap 74 between sensing member portion 58 and the orifice defining button 71 diminishes to increase the pressure in air discharge passage 73. The engagement of the buttons 71 by the sensing member portions 58 defines the extreme closed position of the sensing fingers 56a for any given positions of the two carriers on the gage head body 40.

There is disclosed herein mechanism for quick engagement and disengagement of the finger portions of the sensing members and the workpiece to facilitate loading and unloading of the workpieces, mechanism which is suitable for in-process gages measuring workpieces which are being ground to circular or noncircular form. As shown in FIGS. 4, 6, and 8, each carrier has a retraction plunger 80 slidably received therein and connected to piston 81 slidably received in cylinder 82 of the carrier. When air pressure is supplied through portion 83a of air passage 83 into cylinder 82 behind piston 81, the plunger 80 extends to engage sensing member portion 58 (on the same side of that member which engages button 71) to pivot the sensing member (against the bias of spring 70) and move the finger portions 56a of the sensing members away from the axis D or the workpiece to an extreme open position. When air pressure is released from behind piston 81, spring 84, which is in cylinder 82 in front of piston 81 and engaged therewith, retracts plunger 80 to a position were it is disengaged from sensing member portion 58 when that portion engages button 71. Thus, when the retraction plunger 80 is extended, clearance is provided for removal and insertion of workpieces without the necessity of moving the gage body 40 or the carriers 44 and 45.

As shown best in FIG. 9 the energization and deenergization of the electromagnet 65 is controlled by a control member, defined by a switch, indicated generally at 85, which is operated in coordination with the rotation of the workpiece 24. The switch has two contact arms 86, 87, carrying contacts 86a and 87a, respectively. The contact arms are mounted on a switch standard 88, which is secured to the cradle 19, with contacts 86a and 87a normally spaced apart, or open. The switch has an actuating member, or cam, 89 mounted on shaft 21, which rotates with the worpiece, and the cam 89 is in engagement with the contact arm 87. The cam 89 is constructed to deflect contact arm 87, which is resilient, to move contact 87a into engagement with contact 86a, thereby closing the contacts, except when diametrically opposite low portions 89b pass the arm 87 to release contact 87a from engagement with contact 86a, thereby opening the contacts. In each one-half revolution of the workpiece the contacts are open only as the workpiece rotates through a relatively small angle α, and are closed as the workpiece rotates through the relatively large angle β. In the grinding operation shown for illustrative purposes, the major diameter of the workpiece, indicated at 24a in FIG. 9, is in the same angular position relative to shaft 21 as the major diameter 32a of the workpiece forming cam 32. The cam 89 is angularly positioned on shaft 21 to open the contacts as the major diameter 24a of the workpiece 24 approaches the two finger portions 56a of the sensing members, which are positioned in diametrically opposite positions relative to the workpiece, and to close the contacts as the major diameter 24a of the workpiece 24 leaves the two finger portions 56a. Since, in the particular embodiment of the invention shown, the switch arm 87 engages the cam 89 ninety degrees from the finger portions 56a of the sensing members, the low portions 89b of cam 89 will be centered relative to an axis 21b of shaft 21 ninety degrees from the axis 21a of the shaft aligned with major axes 24a and 32a.

Figure 10:
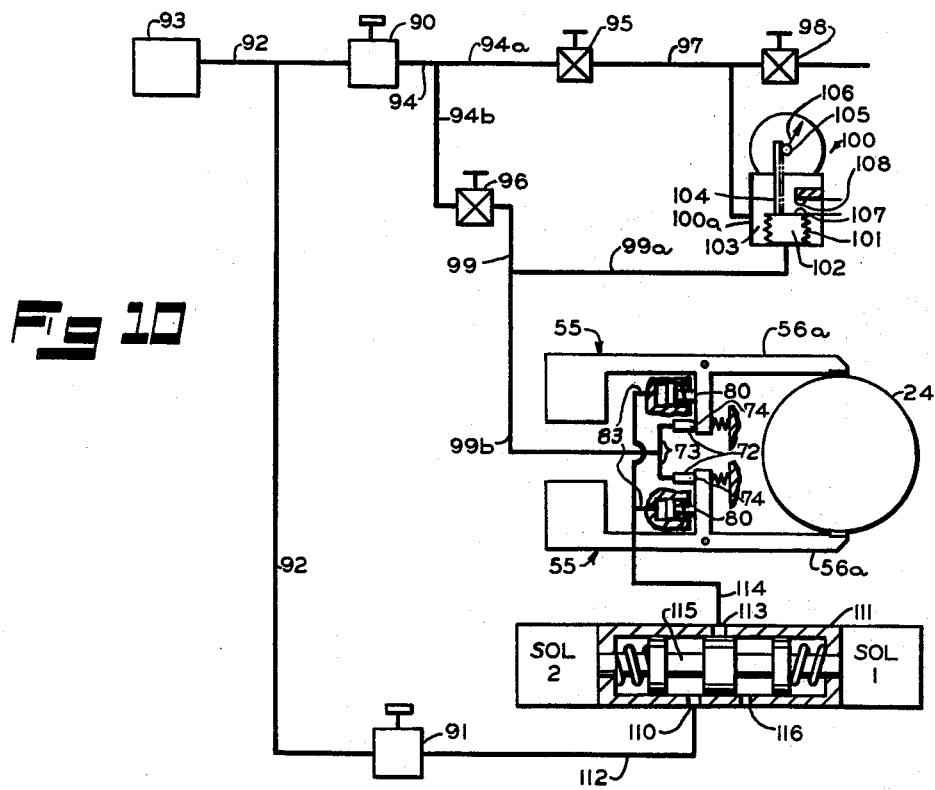
FIG. 10 is a schematic pneumatic diagram of the gaging device.

The pneumatic system for the gaging device of the present invention is shown in FIG. 10. Air under pressure is supplied to pressure regulating valves 90, 91 through line 92 which is connected to a source indicated at 93. A line 94 connected to receive the output pressure of regulating valve 90 has two branches 94a and 94b, each connected to a restrictor valve, 95 and 96, respectively. A predetermined constant reference pressure is established in a line 97 connected between restrictor valve 95 and a restrictor valve 98 through which air is discharged to atmosphere. A line 99 connected to the discharge side of restrictor valve 96 has two branch lines 99a and 99b. Branch 99b is connected to both of the air discharge passages 73 which terminate at the orifices 72 in the sensing member carriers 44 and 45. Each of the air discharge passages 73 comprise portions 73a (FIG. 4) and 74b (FIG. 8) in the carriers 44 and 45, an elongated slot 73c in body 40 in communication with portion 73b, and portion 73d in body 40 (FIGS. 2 and 8).

An indicating member 100 has a resilient expandable bellows 101 which is mounted in a housing 100a to define two chambers 102 and 103. Chamber 102 is connected to air line 99a, the pressure in which is determined by the span of the air gaps 74, and chamber 103 is connected to line 97 in which a predetermined constant reference pressure is maintained. As air gaps 74 close (at finger portions 56a close) the pressure in lines 73, 99b, and 99a, and hence the pressure in chamber 102, rises. Since pressure in chamber 103 remains constant, the bellows 101 expands. Rack 104 is connected to bellows 101 and is engaged with a pinion 105 to which a gage pointer or dial indicator, 106 is connected. As the bellows 101 expands in response to the pressure condition in line 99a, the gage pointer 106 gives a visual indication of the position of the sensing fingers 56a. A switch contact 107 is connected to bellows 101 and engages a fixed switch contact 108 mounted on housing 100a when a predetermined pressure in line 99a is reached, thereby producing a signal when the sensing fingers 56a close to predetermined positions.

Port 110 of a spring centered solenoid valve 111 is connected by line 112 to the discharge side of pressure regulating valve 91. Port 113 of valve 111 is connected by line 114 to both air passages 83 (FIG. 4) in carriers 44 and 45, respectively. When solenoid SOL 1 is energized (solenoid SOL 2 deenergized), the valve member 115 is shifted to the left (as viewed in FIG. 10) to connect line 114 to port 116 which is vented to atmosphere, thereby relieving the pressure from cylinders 81 to retract the plungers 80. When solenoid SOL 2 is energized (solenoid SOL 1 deenergized) the valve member 115 is shifted to the right, to connect port 110 with port 113, and pressure from line 112 is transmitted through lines 114 and 83 to extend plungers 80 and open the fingers 56a.

As shown in FIG. 11, the wheelhead 27 is connected to the piston 120, of hydraulic motor 29, which is slidably received in cylinder 121. A spring centered solenoid valve 122 has a pressure port 123 connected to pressure line 124. Hydraulic fluid from sump 125 is delivered to line 124 by pump 126, relief valve 127 being provided for line 124. The valve 122 has discharge ports 128 and 129 connected to return line 130. Motor port 131 in the valve is connected to one end of the cylinder 121 by line 132 and motor port 132′ in the valve is connected to the other end of the cylinder by line 133, having branches 133a and 133b. When solenoid SOL 3 is energized (solenoid SOL 4 deenergized) valve member 134 is shifted to the left (as viewed in FIG. 11) and pressure line 124 is connected to motor line 133. Flow from valve 122 through line 133 occurs through branch 133a and throttle valve 135 to move the wheelhead to the left (as viewed in FIG. 11) into the workpiece at a feed rate determined by the setting of valve 135. Discharge of fluid from the front of piston 120 occurs through line 132, valve 122, port 128, and line 130. When solenoid SOL 4 is energized (SOL 3 deenergized) valve member 134 is shifted to the right and pressure line 123 is connected to motor line 132. Flow of fluid from the rear of piston 120 occurs primarily through branch line 133b and check valve 136, through the valve 122 and port 129 thereof, to return line 130.

The electrical circuit for the gaging device is shown in FIG. 12. When switch 140 is closed, lines 141 and 142 are connected across a source of electrical energy 143. Push button switch 144 is operated to momentarily close normally open contacts 144–1 which picks up relay CR1, solenoid SOL 1, and solenoid SOL 3. These elements are sealed in through normally open contacts CR1–1 of relay CR1 and normally closed contacts CR2–1 of relay CR2, which latter relay is deenergized at this time. The energization of solenoid SOL 1 causes the plunger 80 to retract to allow the finger portions 56a to close on a workpiece while the energization of SOL 3 initiates feed movement of the wheelhead 27 toward the workpiece.

Normally closed contacts CR2–4 of relay CR2 are closed during the grinding operation and, on each half revolution of the workpiece, the contacts 86a–87a (which are closed the major portion of each half revolution) are momentarily opened, deenergizing magnet windings 67, and then reclosed so that the windings 67 are deenergized as the major diameter of the workpiece passes the finger portions 56a.

As shown in FIG. 13, each sensing member finger portion 56a, by virtue of the bias imparted to the sensing member 55 by spring 70, contacts the major diameter 24a of the workpiece when the winding 67 of locking member 65 is deenergized to release the sensing member 55. The winding 67, however, is immediately reenergized so the locking member again grips the sensing member and holds the finger portions 56a stationary, as indicated at 145 in FIG. 13, relative to the workpiece as portions of the surface (indicated at 147) of smaller radial span pass the finger portions 56a. Each time the sensing member is released by the locking member (as the major diameter of the workpiece passes the sensing member finger portions) the finger portions close a minute amount, as indicated at 146. Thus, as the workpiece is ground and the workpiece diminishes in size, the sensing member finger portions close in very small incremental steps, occurring in very rapid sequence (each half-revolution of the workpiece) to closely approximate the steady gradual movement of a sensing member which is biased into continuous engagement with a workpiece being ground to a circular cross-section.

As the workpiece 24 diminishes in size during grinding the finger portions 56a close, increasing the pressure in line 99a, until, at final size, contacts 107 and 108 are closed to produce a size indicating signal. This energizes relay CR2 and opens contacts CR2–1 of that relay to deenergize solenoid SOL 3, solenoid SOL 1, and relay CR1. Relay CR–2 is sealed in through normally open contact CR2–2 of relay CR2, and normally closed contacts 144–2 of push button switch 144. Normally closed contacts CR2–4 are instantaneous open, delay close contacts and open when relay CR–2 is energized to render the control switch 85 ineffective to energize the windings 67 of locking members 65. The energization of relay CR2 closes the normally open contacts CR2–3 of that relay to energize solenoids SOL 2 and SOL 4. Energization of SOL 2 causes plungers 80 to extend to open the sensing fingers 56a and energization of SOL 4 causes retraction of the grinding wheel from the workpiece. As the plungers 80 open sensing member finger portions 56a, the gaps 74 are also opened, dropping the pressure in line 99a and opening contacts 107–108. Relay CR2 however, remains energized until push button switch 144 is again operated, at the beginning of the next grind cycle, to open contacts 144–2. At that time, the delay close contacts CR2–4 do not close until after the plungers 80 have retracted so that the sensing member finger portions 56a are engaged with the workpiece before the locking member 65 is periodically rendered effective.

What is claimed is:

1. A gaging device for measuring an in-process rotating workpiece comprising in combination a sensing member biased toward the workpiece, a locking member, means to operate the locking member in coordination with the rotation of the workpiece alternately to grip and release the sensing member, and an indicating member responsive to the position of the sensing member.

2. A gaging device for measuring the sector most remote from the axis of a rotating workpiece in process and diminishing in size, the device comprising a movable sensing member having a finger portion biased toward the workpiece and adapted for engagement therewith, a locking member adjacent the sensing member operable when rendered effective to grip said sensing member, a control member responsive to rotation of the workpiece to render the locking member ineffective periodically as said sector passes said finger portion and alternately to render the locking member effective, and an indicating member responsive to the position of the sensing member.

3. A gaging device for measuring the sector most remote from the axis of a rotating workpiece of noncircular cross-section as the workpiece is in process and diminishing in size, the device comprising a movable sensing member having a finger portion biased toward the workpiece and adapted for engagement therewith, a magnet adjacent the sensing member operable when rendered effective to grip said member and hold the finger portion thereof, said magnet releasing the member for engagement of the finger portion with the workpiece when rendered ineffective, a control member operable in coordination with rotation of the workpiece to render the magnet ineffective momentarily as said sector of the workpiece passes said finger portion, and an indicating member responsive to the position of the sensing member to give an indication of the size of said sector of the workpiece.

4. A gaging device for measuring the major diameter of a rotating workpiece of noncircular cross-section as the workpiece is in process and diminishing in size, the device comprising a movable sensing member having a finger portion biased toward the workpiece and adapted for engagement therewith, an electromagnet adjacent the sensing member operable when energized to grip the sensing member and hold the finger portion thereof, said magnet releasing the sensing member for engagement of the finger portion with the workpiece when the magnet is deenergized, a control switch in circuit with the electromagnet operable in coordination with rotation of the workpiece to deenergize the magnet momentarily as the major diameter of the workpiece passes said finger portion, and an indicating member responsive to the position of the sensing member to give a visual indication of the size of the major diameter of the workpiece.

5. A gaging device for measuring the major diameter of a rotating workpiece of noncircular cross-section as the workpiece is in process and diminishing in size, the device comprising means defining an orifice, a sensing member movable relative to the orifice and having a finger portion biased toward the workpiece for engagement therewith, said sensing member and the orifice defining a gap therebetween with a span determined by the position of the sensing member, an electromagnet adjacent the sensing member operable when energized to grip the sensing member and hold the finger portion thereof, said magnet releasing the sensing member for engagement of the finger portion with the workpiece when the magnet is deenergized, a control switch in circuit with the electromagnet operable in coordination with rotation of the workpiece to deenergize the magnet as the major diameter of the workpiece approaches said finger portion and operable as the major diameter of the workpiece leaves said finger portion to energize the magnet, and a pneumatically operated indicating member connected to said orifice and responsive to the span of said gap to give a visual indication of the size of the major diameter of the workpiece.

6. In a grinding machine having means to rotate a workpiece in abrading contact with a grinding wheel, said means including a member rotating with the workpiece, a gaging device for measuring the major diameter of an in-process workpiece of noncircular cross-section comprising means defining an orifice, a sensing member movable relative to the orifice and having a finger portion biased toward the workpiece for engagement therewith, said sensing member and the orifice defining a gap therebetween with a span determined by the position of the sensing member, an electromagnet adjacent the sensing member operable when energized to grip the sensing member and hold the finger portion thereof, said magnet releasing the sensing member for engagement of the finger portion with the workpiece when the magnet is deenergized, a control switch in circuit with the electromagnet having an actuating member mounted on said rotating member of the grinding machine for rotation in coordination with the rotation of the workpiece, said actuating member operable to open the switch and deenergize the magnet as the major diameter of the workpiece approaches the finger portion and operable to close the switch and energize the magnet as the major diameter of the workpiece leaves the finger portion, a pneumatically operated dial indicator connected to said orifice and responsive to the span of said gap to give a visual indication of the size of the major diameter of the workpiece, a plunger adjacent the sensing member operable when actuated to move the sensing member for retraction of the finger portion from the workpiece, and means operable when the gap is of predetermined span to render the control switch ineffective for energizing the magnet and to actuate the plunger.

7. In a grinding machine having a rotating member to hold and rotate a workpiece in abrading contact with a grinding wheel and having means to effect a relative reciprocation between the workpiece and the grinding wheel in coordination with the rotation of the workpiece to form a workpiece of noncircular cross-section, an in-process gaging device for measuring the major diameter of the workpiece comprising means defining an orifice, a sensing member movable relative to the orifice and having a finger portion biased toward the workpiece for engagement therewith, said sensing member and the orifice defining a gap therebetween with a span determined by the position of the sensing member, an electromagnet adjacent the sensing member operable when energized to grip the sensing member and hold the finger portion thereof, said magnet releasing the sensing member for engagement of the finger portion with the workpiece when the magnet is deenergized, a control switch in circuit with the electromagnet having an actuating member mounted on said rotating member of the grinding machine for rotation in coordination with the rotation of the workpiece, said actuating member operable to open the switch and deenergize the magnet as the major diameter of the workpiece approaches the finger portion and operable to close the switch and energize the magnet as the major diameter of the workpiece leaves the finger portion, a pneumatically operated dial indicator connected to said orifice and responsive to the span of said gap to give a visual indication of the size of the major diameter of the workpiece, a plunger adjacent the sensing member operable when actuated to move the sensing member for retraction of the finger portion from the workpiece, and means operable when the gap is of predetermined span to render the control switch ineffective for energizing the magnet, to actuate the plunger, and to initiate separation of the grinding wheel and the workpiece.

8. In a gaging device for measuring an in-process rotating workpiece the combination comprising, a sensing member carrier, a sensing member pivotally mounted in the carrier and having a portion extending from the carrier adapted for engagement with the workpiece, means to bias the sensing member for engagement of said extending portion with the workpiece, a retraction member adjacent the sensing member operable to pivot the sensing member for retraction of the workpiece engaging portion thereof from the workpiece, and means to actuate the retraction member after the sensing member is in a predetermined position.

9. In a grinding machine having a workpiece support and a grinding wheel for grinding a workpiece rotating in an operating position on the workpiece support to a final size, a sensing member mounted adjacent the operating position for sensing engagement with a rotating workpiece during grinding, a retraction member mounted adjacent the sensing member operable when actuated to retract the sensing member from the workpiece, and means responsive to the sensing engagement of the sensing member with the workpiece to actuate said retraction member when the workpiece is ground to final size.

10. In a machine tool gaging device for measuring a workpiece rotating in an operating position, a sensing member carrier mounted in a fixed position relative to the operating position of the workpiece, a sensing member pivotally mounted in the sensing member carrier having a portion extending from the carrier adapted to engage the workpiece, means to bias the sensing member into engagement with the rotating workpiece, a retraction member mounted in the sensing member carrier operable when actuated to pivot the sensing member against said bias for retraction of the workpiece engaging portion from the workpiece, and means responsive to the sensing member to actuate said retraction member when the sensing member is in a predetermined position.

11. In a grinding machine having a relatively movable workpiece support and grinding wheel and having means to effect relative feeding movement therebetween for grinding a workpiece to a final size, a gaging device for measuring the in-process workpiece comprising in combination a sensing member carrier mounted in a fixed position relative to a workpiece supported for grinding, a sensing member pivotally mounted in the sensing member carrier and having a workpiece engaging portion extending from the carrier, means in the sensing member carrier to bias the sensing member for engagement of the workpiece engaging portion thereof with the rotating workpiece, a retraction plunger mounted in the sensing member carrier extendable into contact with the sensing member to move the workpiece engaging portion out of engagement with the workpiece, and means responsive to the position of the sensing member to extend said plunger when the workpiece is ground to final size and to terminate feeding movement between the grinding wheel and workpiece support.

12. A gaging device for measuring the major diameter of a rotating workpiece of noncircular cross-section as the workpiece is in process and diminishing in size, the device comprising a support adjacent the rotating workpiece during grinding, means defining an orifice in the support, a sensing member pivotally mounted in the support and having a finger portion extending from the support, the sensing member and finger portion pivotal relative to said support as a unit and biased to urge the finger portion toward the workpiece axis for engagement with the workpiece surface, said sensing member and the orifice defining a gap therebetween with a span varying during grinding as the finger portion moves toward the axis of the rotating workpiece, an electromagnet adjacent the sensing member operable when energized to grip the sensing member and hold the finger portion thereof stationary relative to the support, said electromagnet releasing the sensing member for engagement of the finger portion with the surface of the workpiece when the electromagnet is deenergized, a control switch in circuit with the electromagnet operable in coordination with rotation of the workpiece to deenergize the electromagnet as the major diameter of the workpiece approaches said finger portion and operable as the major diameter of the workpiece leaves said finger portion to energize the electromagnet, a source of air under pressure, a pneumatic indicating member, and means to connect said pneumatic indicating member to said source of air under pressure and said orifice to render said indicating member responsive to the span of said gap.

References Cited in the file of this patent

UNITED STATES PATENTS

| | | |
|---|---|---|
| 1,543,795 | Rockwell | June 30, 1925 |
| 2,482,783 | Longworth et al. | Sept. 27, 1949 |